US012578240B2

(12) United States Patent
Arjani et al.

(10) Patent No.: US 12,578,240 B2
(45) Date of Patent: Mar. 17, 2026

(54) SYSTEM AND METHOD FOR MONITORING FIBER OPTIC CABLES

(71) Applicant: SAUDI ARABIAN OIL COMPANY, Dhahran (SA)

(72) Inventors: Abdullah M. Arjani, Al-Kharj (SA); Salman D. Mutairi, Riyadh (SA); Sulaiman A. Alwasel, Unayzah (SA); Sultan D. Nufaiee, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 470 days.

(21) Appl. No.: 18/171,266

(22) Filed: Feb. 17, 2023

(65) Prior Publication Data

US 2024/0280418 A1 Aug. 22, 2024

(51) Int. Cl.
| | |
|---|---|
| *G01K 11/324* | (2021.01) |
| *G01K 1/02* | (2021.01) |
| *G01K 1/022* | (2021.01) |
| *G01K 1/024* | (2021.01) |
| *G01K 11/32* | (2021.01) |
| *G01K 11/3206* | (2021.01) |

(52) U.S. Cl.
CPC ............ *G01K 11/324* (2021.01); *G01K 1/022* (2013.01); *G01K 1/024* (2013.01); *G01K 1/026* (2013.01); *G01K 11/32* (2013.01); *G01K 11/3206* (2013.01)

(58) Field of Classification Search
CPC ...... G01K 11/324; G01K 1/022; G01K 1/024; G01K 11/32; G01K 11/3206
See application file for complete search history.

(56) References Cited

U.S. PATENT DOCUMENTS

| | | | | |
|---|---|---|---|---|
| 9,335,224 | B2 * | 5/2016 | MacDougall | ........ G02B 6/3827 |
| 10,634,553 | B1 * | 4/2020 | Hveding | ........... G01K 11/3206 |
| 10,880,007 | B1 * | 12/2020 | Hveding | ........... G02B 6/29361 |
| 11,209,307 | B2 * | 12/2021 | Hveding | ............... G01H 9/004 |
| 2005/0094129 | A1 * | 5/2005 | MacDougall | ...... G01K 11/3206 |
| | | | | 356/73.1 |
| 2014/0312215 | A1 * | 10/2014 | Smith | ..................... G01L 1/242 |
| | | | | 250/253 |

(Continued)

FOREIGN PATENT DOCUMENTS

CN 102147297 B 11/2013

*Primary Examiner* — Laura Martin
*Assistant Examiner* — Philip L Cotey
(74) *Attorney, Agent, or Firm* — Osha Bergman Watanabe & Burton LLP

(57) ABSTRACT

A system may include a fiber optic cable buried under a surface and a smart sensor module coupled to the fiber optic cable. A controller may be coupled to the smart sensor module. The smart sensor module includes a light source coupled to an end of the fiber optic cable and a detector coupled to the end of the fiber optic cable. The controller may manage a transmission of a pulse of light from the light source to launch the pulse of light into the fiber optic cable. The detector may receive a backscatter generated from the pulse of light scattered off fiber molecules of the fiber optic cable. The smart sensor module may determine a temperature of the fiber optic cable based on an intensity of the generated backscatter. The controller may send an alert when the determined temperature is outside a predetermined threshold range from a base temperature.

19 Claims, 9 Drawing Sheets

(56)                    References Cited

U.S. PATENT DOCUMENTS

| | | | |
|---|---|---|---|
| 2017/0146409 A1* | 5/2017 | Hadley | G01K 3/10 |
| 2017/0167949 A1* | 6/2017 | Xia | G01M 11/083 |
| 2017/0336268 A1* | 11/2017 | Wilson | G01K 11/32 |
| 2018/0058982 A1* | 3/2018 | Hartog | G01H 9/004 |
| 2018/0143085 A1* | 5/2018 | Uno | G01K 11/32 |
| 2019/0003903 A1* | 1/2019 | Godfrey | G01D 5/35361 |
| 2020/0233107 A1* | 7/2020 | Constantinou | G01V 1/226 |
| 2022/0085882 A1* | 3/2022 | Murphy | H04B 10/85 |
| 2024/0230426 A9* | 7/2024 | Suh | G01K 11/324 |

* cited by examiner

SYSTEM AND METHOD FOR MONITORING FIBER OPTIC CABLES

BACKGROUND

Fiber optic cables may be used in a wide variety of industries such as oil and gas, telecommunications, medical, defense, manufacturing, broadcasting, lightning, and other industries that require data transmission. Fiber optic cables may refer to optic cables or optical fiber cables which transfer data signals in the form of light. The fiber optic cables include optical fibers within a casing. For example, optical fibers are typically individually coated with plastic layers and contained in the casing (i.e., a protective tube) suitable for the environment where the fiber optic cables will be used.

As fiber optic cables are used in a wide variety of industries, the fiber optic cables may have various lengths and be used in various environments. For example, the fiber optic cables extend from the first location to a second location to transmit data between the two locations. Additionally, the fiber optic cables may be buried underground from the first location to the second location. However, over time, the buried fiber optic cables may become exposed (i.e., unburied) and potentially damaged by the environment. As such, frequent inspection and testing is required to determine if the fiber optic cables have become exposed. Conventional methods may be time consuming, rely on human inspection, and fail to provide real-time analysis when the fiber optic cables have become exposed. As a result, conventional methods are prone to human errors resulting in delayed detection of exposure, loss of connection in the fiber optic cables, expensive damages in the fiber optic cables, and non-productive time (NPT).

SUMMARY OF DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system that may include a fiber optic cable buried under a surface; a smart sensor module coupled to the fiber optic cable; and a controller coupled to the smart sensor module. The smart sensor module may include a light source coupled to an end of the fiber optic cable and a detector coupled to the end of the fiber optic cable. Additionally, the controller may manage a transmission of a pulse of light from the light source to launch the pulse of light into the fiber optic cable, the detector may receive a backscatter generated from the pulse of light scattered off fiber molecules of the fiber optic cable, the smart sensor module may determine a temperature of the fiber optic cable based on an intensity of the generated backscatter, and the controller may send an alert when the determined temperature is outside a predetermined threshold range from a base temperature.

In another aspect, embodiments disclosed herein relate to a method that may include connecting a smart sensor module to a fiber optic cable, launching a pulse of light from a light source of the smart sensor module into the fiber optic cable, generating backscatter from light rays of the pulse of light scattering off fiber molecules of the fiber optic cable, receiving the generated backscatter with a detector of the smart sensor module, and determining, with the smart sensor module, a temperature of the fiber optic cable based on the generated backscatter.

In yet another aspect, embodiments disclosed herein relate to a non-transitory computer readable medium storing instructions on a memory coupled to a processor. The instructions may include functionality for launching a pulse of light from a light source of a smart sensor module into a fiber optic cable, receiving a backscatter with a detector of the smart sensor module, the backscatter is generated from light rays of the pulse of light scattering off fiber molecules of the fiber optic cable, and determining, with the smart sensor module, a temperature of the fiber optic cable based on the generated backscatter.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, shapes of the elements as drawn are not necessarily intended to convey any information regarding the actual shape of the elements and have been solely selected for ease of recognition in the drawing.

DETAILED DESCRIPTION

Figure 1:
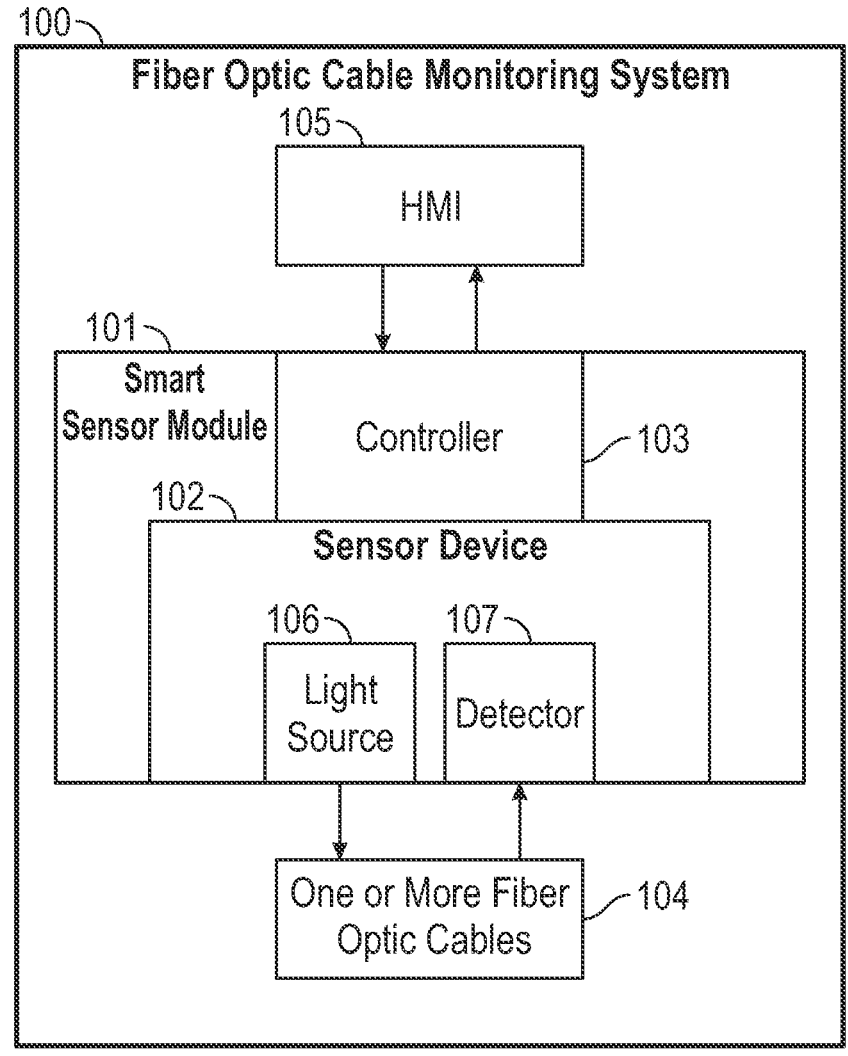
FIG. 1 illustrates a block diagram of a fiber optic cable monitoring system in accordance with one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-11 any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one or more embodiments, the present disclosure may be directed to systems and methods for monitoring fiber optic cables. More specifically, embodiments disclosed herein are directed to using a smart sensor module to provide continuous temperature sensing over a length of the fiber optic cables. Additionally, the smart sensor module may send alerts or alarms in real-time based on determined temperatures in the fiber optic cables. The alarms may include hot and cold spots within the fiber optic cables, and a location at which the temperature was taken over any length of the fiber optic cables. In some embodiments, the fiber optic cables may be buried at some distance underground. Accordingly, the systems and methods for monitoring fiber optic cables disclosed herein provide a long-distance temperature sensor and can detect exposed areas of the fiber optic cables (in remote or high traffic areas). One or more embodiments of a method for using the smart sensor module results in achieving continuous monitoring without the need for visual inspection of the fiber optic cables from operators/workers, testing the fiber optic cables, and a reduction in operational costs associated with conventional fiber optic cable testing. Overall, the smart sensor module for monitoring the fiber optic cables as described herein may reduce product engineering, reduction of assembly time, hardware cost reduction, and weight and envelope reduction.

Turning to FIG. 1, FIG. 1 shows a block diagram of a fiber optic cable monitoring system 100 in accordance with one or more embodiments. In some embodiments, the fiber optic cable monitoring system 100 may be fully autonomous. The fiber optic cable monitoring system 100 includes a smart sensor module 101 having a sensor device 102 in communication with a controller 103. The sensor device 102 is coupled to one or more fiber optic cables 104. For example, the sensor device 102 may be coupled to a terminal end or fiber patch panel of the one or more fiber optic cables 104 via a fiber patch cord cable. In some embodiments, the sensor device 102 and the controller 103 may be integrated within a human-machine interface (HMI) 105. The controller 103 may manage a transmission of light from a light source 106 in the sensor device 102. The light source 106 will launch a pulse of light into the one or more fiber optic cables 104 based on commands from the smart sensor module 101. Additionally, a detector 107 of the sensor device 102 receives light scattered back (i.e., generated backscatter) to the sensor device 102 from the one or more fiber optic cables 104.

In some embodiments, the one or more fiber optic cables 104 may be a backbone fiber optic cable. The backbone fiber optic cable refers to a portion of a network cabling system which connects across various locations (i.e., work site, office builds, etc.) and communication panels. For example, the backbone fiber optic cable may be connected to the various collection networks of mobile (2G, 3G, 4G, 5G) and fixed (FTTX, local radio loops, WIFI, etc.) operators. The backbone fiber optic cable concentrates and transports data flows between networks across various locations. Typically, the backbone fiber optic cable carries the largest number of fibers and is the longest cable run in network cabling system. In some embodiments, the backbone fiber optic cable is buried underground or within building structures. For example, the backbone fiber optic cable may be buried underground a distance of between 0 kilometers to 100 kilometers (0 miles to 63 miles) between network locations.

In one or more embodiments, the sensor device 102 provides temperature and distance measurements over the length of the one or more fiber optic cables 104. For example, the light source 106, such as a laser, of the sensor device 102 sends a pulse of light through the one or more fiber optic cables 104. When the pulse of light enters the one or more fiber optic cables 104, various optical properties of the pulse of light, such as frequency, light signal, light intensity, wavelength, and light index, may change in value. For example, the light signal of the pulse of light decreases over the length the one or more fiber optic cables 104 as the pulse of light travels further from the light source 106. The one or more fiber optic cables 104 transports light ray through a principle of internal reflection. The principle of internal reflection states that when a light ray passes through a boundary between two materials of different refractive indices (e.g., the core and cladding of the one or more fiber optic cables 104), a part of the light ray will be refracted at the surface of the boundary, and another part will be reflected. For example, a portion of the pulse of light that is launched through the one or more fiber optic cables 104 is scattered (i.e., reflected) and guided back towards the detector 107 of the sensor device 102. The scattered light guided back to the detector 107 is known as backscatter. The backscatter is used to determine changes in the optical properties of the pulse of light. For example, if the backscatter returns to the detector 107 unchanged, there is no change in a wavelength of the pulse of light.

However, when an amount of the backscatter returns to the detector 107 changed, this changed backscatter is referred to as Raman scattering or the Raman effect. Raman scattering is an optical process where incoming light interacts with molecules to produce scattered light that is lessened in energy by the vibrational modes of chemical bonds of the molecules. Additionally, a spectrum of peaks is produced at different optical wavelengths, all higher than the incoming light, that represent the vibrational fingerprint of the molecules. Thus, peaks can signify chemical constituents, and scanning of this form produces a spatial chemical map of the molecules. Due to the low Raman scattering efficiency of most materials, a coherent light source (e.g., a laser) is required for Raman scattering. Furthermore, the Raman scatter is thermally influenced by temperature such that the intensity of the Raman scatter depends on temperature. A temperature of the Raman scatter can be determined by measuring the respective intensities of stokes (longer wavelength) and anti-stokes (shorter wavelength) signals produced in the Raman Scatter. For example, the measured intensities in Rahman scattering are used to calculate the temperature as follows. Once the light is scattered back from the fiber optic, the backscatter contains three different spectral shares. The three different spectral shares may be the Rayleigh scattering with the wavelength of the laser source used, the strokes line components from photons shifted to longer wavelength (lower frequency), and the anti-stokes line components with photons shifted to shorter wavelength (higher frequency) than the Rayleigh scattering. The intensity called anti-stokes band is temperature-dependent, while the intensity called stokes band is practically independent of temperature. From the spectral shares, a local temperature of the one or more fiber optic cables 104 is derived from the ratio of the anti-stokes and stokes light intensities.

In some embodiments, the smart sensor module 101 records, in real-time, the backscatter of the pulse of light traveling through the one or more fiber optic cables 104. The smart sensor module 101 will also in real-time systematically interpolate the backscatter to intensity over time curves to determine a temperature of the one or more fiber optic cables 104. For example, the smart sensor module 101 may generate commands for the controller 103 to operate the light source 106 to generate and launch the pulse of light through the one or more fiber optic cables 104. As the pulse of light travels through the one or more fiber optic cables 104, fiberglass molecules of the one or more fiber optic cables 104 scatter light rays of the pulse of light. As the pulse of light propagates down the one or more fiber optic cables 104, the pulse of light also exchanges energy with lattice vibrations. Additionally, the backscatter is reflected to travel back to the detector 107. Based on the received backscatter, the smart sensor module 101 will calculate the temperature based on the intensity of the backscatter. Additionally, the smart sensor module 101 may determine a location of the determined temperature along the one or more fiber optic cables 104. For example, when the pulse of light is launched, a time stamp may be created such that when the backscatter is received, a position of the temperature reading can be determined by measuring the time taken for the backscatter to return to the detector 107 from the initial time stamp.

Based on the determined temperature in the one or more fiber optic cables 104, the smart sensor module 101 will generate alerts or alarms when the determined temperature is outside a predetermined threshold range. For example, the predetermined threshold range may be a range of temperatures that the one or more fiber optic cables 104 is maintained at to optimized data transfer. The predetermined threshold range may be uploaded and stored on a memory coupled to the controller 103. In one or more embodiments, when the determined temperature is outside the predetermined threshold range, the smart sensor module 101 generates an alarm to alert an operator that the one or more fiber optic cables 104 may be exposed (e.g., unburied) and is no longer within the predetermined threshold range. Additionally, the smart sensor module 101 may also record the location at which the determined temperature was taken. By knowing the location at which the determined temperature was taken, a drone or an operator may be deployed to the location to inspect the one or more fiber optic cables 104. Based on the results of the inspection, maintenance and repair operations may be conducted to bring the one or more fiber optic cables 104 back to the predetermined temperature. For example, an operator may submit a request or conduct immediate action for reinstatement through the course of backfilling the entire exposed fiber optic cable to rebury the one or more fiber optic cables 104.

Still referring to FIG. 1, the controller 103 may be hardware and/or software that includes functionality to manage a pulse of light from the light source 106, for example, to launch the pulse of light through the one or more fiber optic cables 104. The controller 103 informs the smart sensor module 101 to launch the pulse of light through the one or more fiber optic cables 104 from the light source 106. Specifically, the controller 103 may control the use and transmission of the light source 106 such that the light source 106 generates and launches a pulse of light through the one or more fiber optic cables 104. Likewise, the controller 103 may also control a fiber switch within the smart sensor module 101 to automatically connect the light source 106 and the detector 107 to one or more one or more fiber optic cables 104. Additionally, the controller 103 may also control warning alarms to an operator or drone. It is further envisioned that the controller 103 may be a ruggedized computer system with functionality to withstand vibrations, extreme temperatures, wet conditions, and/or dusty conditions, for example, around a construction site, a well, high traffic roads, or remote locations.

Moreover, the controller 103 may be coupled to various control systems that include multiple PLCs within the sensor device 102 and the one or more fiber optic cables 104. For example, a control system may include functionality to control operations within a system, assembly, and/or subassembly described below in FIGS. 2-10 and the accompanying description. As such, the fiber optic cable monitoring system 100 may include functionality to monitor and/or perform various testing processes performed by various operations with respect to detect exposed buried fiber optic cables. Without loss of generality, the term "control system" may refer to a fiber optic cable operation control system that is used to operate and control the equipment, data acquisition, and monitoring system that is used to acquire data process and equipment data and to monitor the operation of the data process, or a production interpretation software system that is used to analyze and understand fiber optic cable events and progress.

In one or more embodiments, the HMI 105 may be hardware and/or software coupled to the smart sensor module 101. For example, the HMI 105 may allow the operator to interact with the sensor device 102 and the one or more fiber optic cables 104, e.g., to send commands to the controller 103 to generate and launch pulses of light, or to view sensor information (e.g., the light source 106 and the detector 107) from the smart sensor module 101. Further, the HMI 105 may include functionality for presenting data and/or receiving inputs from a user regarding various fiber optic cable operations. For example, the HMI 105 may be a user device such as personal computers, smartphones, and any other devices coupled to a network that obtain inputs from one or more users, e.g., by providing a graphical user interface (GUI) for presenting data and/or receiving control commands for operating the smart sensor module 101.

In some embodiments, the smart sensor module 101 transmits data via a network element coupled to the HMI 105. The network element may refer to various hardware components within a network, including switches, routers, hubs or any other logical entities for uniting one or more physical devices on the network. For example, a network element, the HMI 105, and/or the smart sensor module 101 may be a computing device similar to the computing device shown in FIG. 11.

Figure 2:
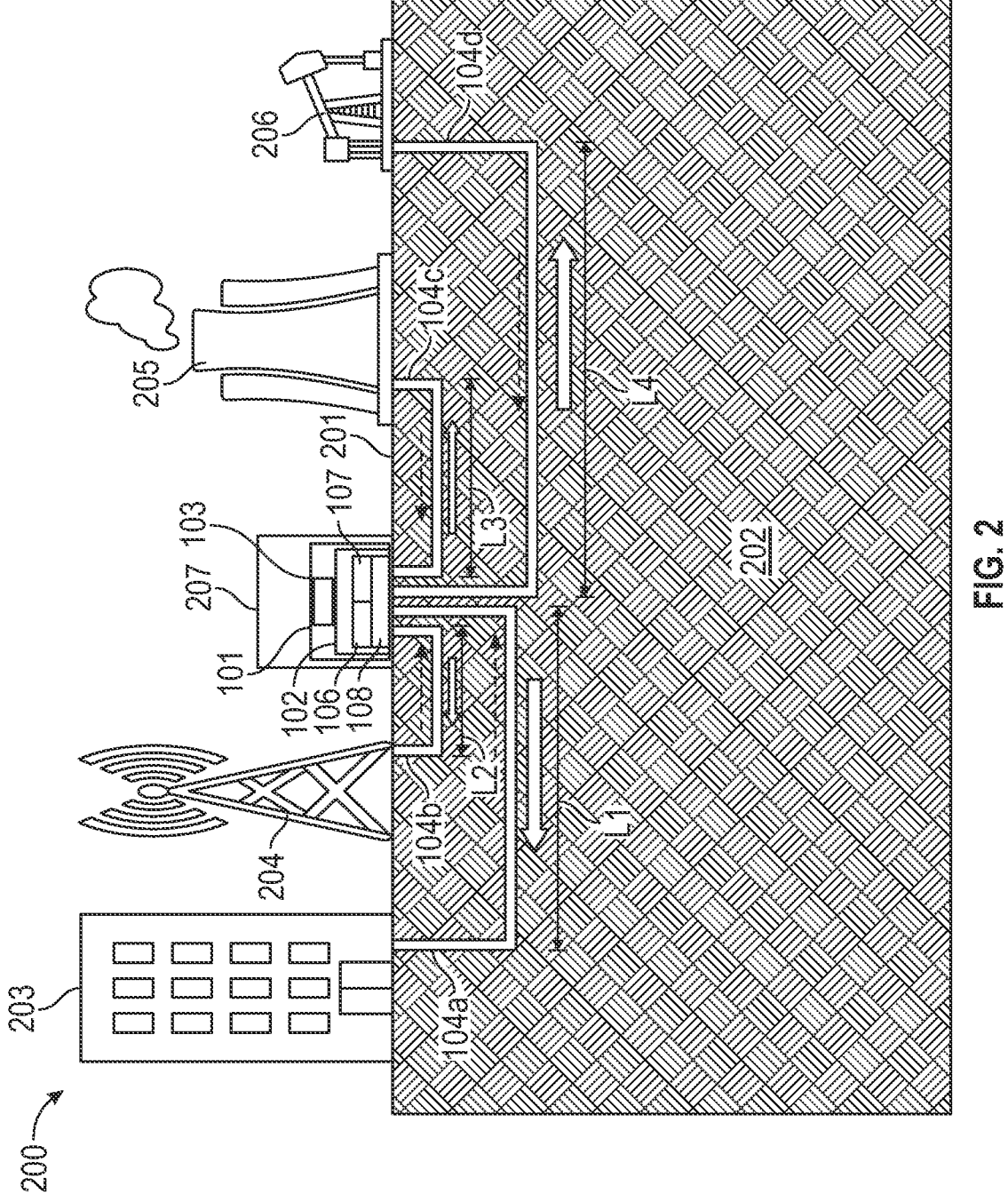
FIGS. 2 and 3 illustrate a schematic diagram of a site using the fiber optic cable monitoring system of FIG. 1 in accordance with one or more embodiments of the present disclosure.

Turning to FIG. 2, in one or more embodiments, FIG. 2 shows an example of operating the smart sensor module 101 of FIG. 1 at a site 200. The site 200 may include various structures on a surface 201 of a formation 202. For example, the various structures may be one of an office building 203, a communications tower 204, a plant 205 (e.g., oil refinery or chemical plant or manufacturing plant), a well site 206 (e.g., drilling or completion rig), or any other suitable structure able to use fiber optic cables.

In one or more embodiments, a control panel 207 is provided at the site 200. The control panel 207 may be an electrical control panel within an enclosure (e.g., a metal or plastic box) which contains electrical components, such as circuit breakers and power distribution systems, that control and monitor a number of devices. For example, the control panel 207 may communicate between a host network and the various structures (203-206) of site 200. Additionally, the control panel 207 may be in a central communication building. The control panel 207 may include various functions such as consolidating connections to the various structures (203-206), managing power provided to the various structures (203-206), transmitting data to the various structures (203-206), and other control operations. Additionally, the control panel 207 may have various printed circuit boards with connections to all the various structures (203-206). Furthermore, the control panel 207 may come in various shapes and sizes such that the control panel 207 may be free standing or integrated within one of the various structures (203-206). In some embodiments, each of the various structures (203-206) may include a control panel (207).

Still referring to FIG. 2, in one or more embodiments, one or more fiber optic cables (104a-104d) are used to connect the control panel 207 to the various structures (203-206). For example, a first fiber optic cable 104a extends a first length L1 from the control panel 207 to the office building 203, a second fiber optic cable 104b extends a second length L2 from the control panel 207 to the communications tower 204, a third fiber optic cable 104c extends a third length L3 from the control panel 207 to the plant 205, and a fourth fiber optic cable 104d extends a fourth length L4 from the control panel 207 to the well site 206. Each length (L1-L4) of the fiber optic cables (104a-104d) may be varied to cover any distance (e.g., 0 to 100 kilometers) from the control panel

207 to the corresponding structure (203-206). Additionally, each of the fiber optic cables (104a-104d) may have a first terminal end connected to a fiber patch panel of the control panel 207 and a second terminal end connected to a corresponding fiber patch panel within the corresponding structure (203-206). The first terminal end and the second terminal may be an optical fiber connector to allow the fiber optic cables (104a-104d) to be easily connected and disconnected from transmitting and receiving equipment in the control panel 107 and the corresponding structure (203-206).

In some embodiments, the fiber optic cables (104a-104d) are buried within the formation 202 to be below the surface 201. For example, conduits may be drilled or dug into the formation such that each of the fiber optic cables (104a-104d) travel through the conduits from one location (e.g., the control panel 107) to another location (e.g., corresponding structure (203-206)) below the surface 201. By having the fiber optic cables (104a-104d) buried within the formation 202, the fiber optic cables (104a-104d) are protected from various environmental hazards and human traffic. However, in some instances, the fiber optic cables (104a-104d) may become unburied and exposed to environmental hazards and human traffic.

To continuously monitor the fiber optic cables (104a-104d), the smart sensor module 101 is coupled to the fiber optic cables (104a-104d). For example, the smart sensor module 101 may be installed in the control panel 207. In the control panel 207, the smart sensor module 101 is electronically coupled to each of the fiber optic cables (104a-104d). For example, a fiber switch 108 of the smart sensor module 101 is connected to the first terminal end of each fiber optic cable (104a-104d). The fiber switch 108 allows the smart sensor module 101 to transmit and receive data dedicated to one fiber optic cable (104a-104d) at a time. In some embodiments, each fiber optic cable (104a-104d) may have a dedicated smart sensor module (101) within the control panel 207. Alternatively, a smart sensor module (101) may be provided in each of the structures (203-206) connected to the second terminal end of each fiber optic cable (104a-104d).

As shown in FIG. 2, the smart sensor module 101 is configured to launch a pulse of light (see block arrows) through each of the fiber optic cables (104a-104d). For example, the controller 103 of the smart sensor module 101 switches the fiber switch 108 to place the sensor device 102 of the smart sensor module 101 in communication with a corresponding fiber optic cable (104a-104d). This also allows the light source 106 of the sensor device 102 and the detector 107 of the sensor device 102 to be in communication with the corresponding fiber optic cable (104a-104d). With the sensor device 102 in communication with the corresponding fiber optic cable (104a-104d), the controller 103 will command the light source 106 to launch the pulse of light (see block arrows) through the corresponding fiber optic cable (104a-104d). As the pulse of light (see block arrows) travels thought the corresponding fiber optic cable (104a-104d), backscatter (see dashed arrows) is generated from the pulse of light (see block arrows) reflecting within the corresponding fiber optic cable (104a-104d) based on principle of internal reflection. The backscatter (see dashed arrows) travels back through the corresponding fiber optic cable (104a-104d) and is received by the detector 107. The smart sensor module 101 uses the backscatter (see dashed arrows) to determine changes in the optical properties of the pulse of light (see block arrows). For example, if the backscatter (see dashed arrows) returns to the detector 107 unchanged, there is no change in a wavelength of the pulse of light (see block arrows).

However, when the amount of the backscatter (see dashed arrows) returns to the detector 107 changed, this changed backscatter is referred to as the Raman scatter. the Raman scatter is thermally influenced by temperature such that the intensity of the Raman scatter depends on temperature. A temperature of the Raman scatter can be determined by the smart sensor module 101 measuring the respective intensities of stokes (longer wavelength) and anti-stokes (shorter wavelength) signals produced in the Raman scatter. As the corresponding fiber optic cable (104a-104d) is buried within the formation 202, the temperature of the Raman Scatter should remain constant. A constant temperature of the Raman Scatter represents that the corresponding fiber optic cable (104a-104d) is unchanged and remains buried within the formation 202.

Figure 3:
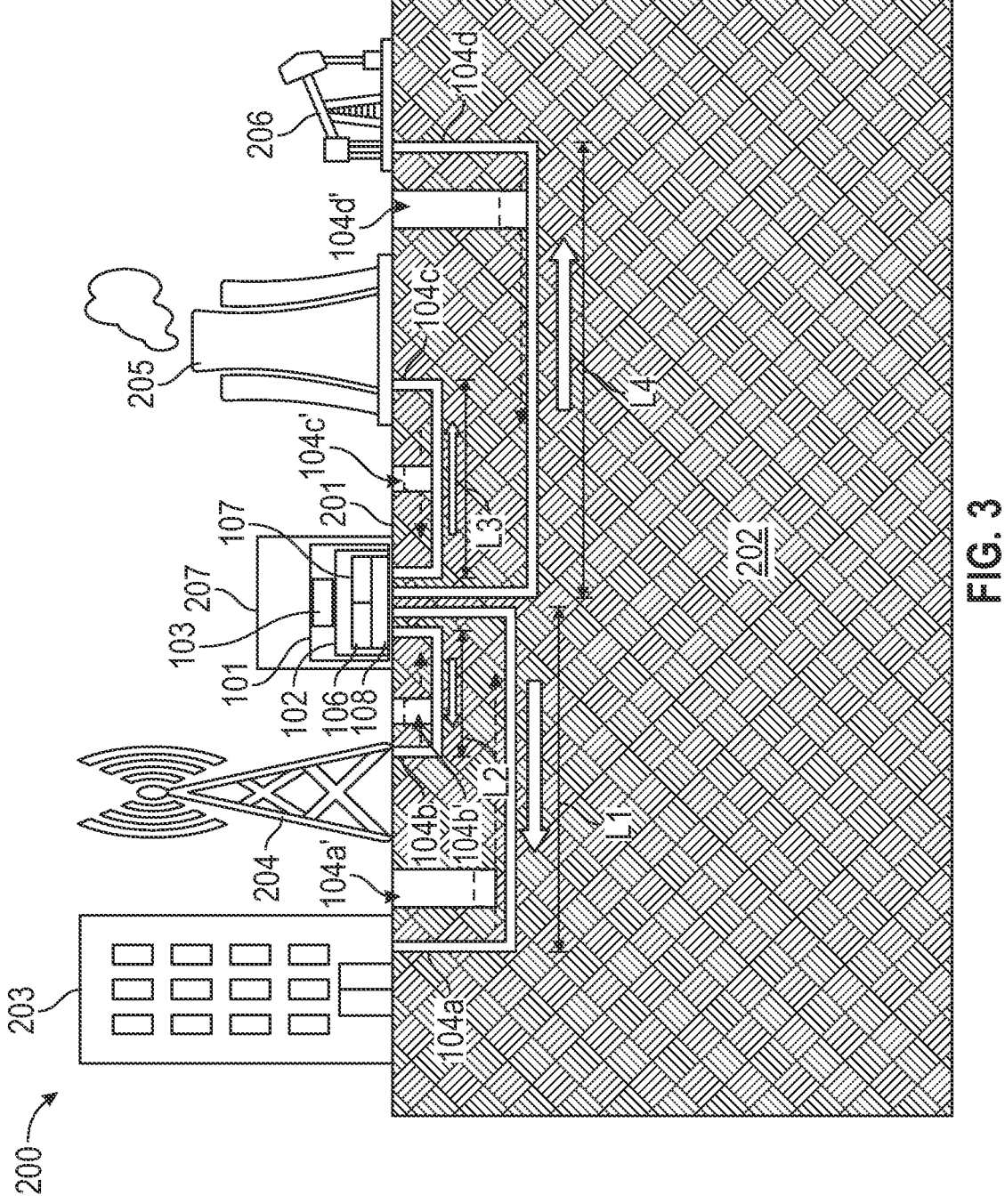

As shown in FIG. 3, an example of the fiber optic cables (104a-104d) being exposed is illustrated. For example, various factors such as weather conditions (e.g., rainfall, earthquakes, hurricanes and tornadoes, wind, and other weather events) and human intervention (e.g., construction, traffic, and human occurrences) may cause the formation 202 to be altered such that the surface 201 has portions exposing the fiber optic cables (104a-104d). As shown, such factors result in a first portion 104a' of the first fiber optic cable 104a, a second portion 104b' of the second fiber optic cable 104b, a third portion 104c' of the third fiber optic cable 104c, and a fourth portion 104d' of the fourth fiber optic cable 104d, being exposed or no longer buried under surface 201.

In one or more embodiments, the intensity of the Raman scatter changes in the corresponding exposed portions (104a'-104d') of the fiber optic cables (104a-104d, respectively). For example, during the summer seasons or hot days, it can be expected that the surrounding environment has an increased temperature, increasing the intensity of the Raman scatter and thereby also increasing the temperature of the Raman scatter. Alternatively, during the winter seasons or cold days, it can be expected that the surrounding environment has a decreased temperature which will decrease the intensity of the Raman scatter, thereby also decreasing the temperature of the Raman scatter.

Additionally, the smart sensor module 101 time stamps the pulse of light (see block arrows) when launched from the light source 106. Next, the smart sensor module 101 compares the time stamp to when the backscattered (see dashed arrows) is received by the detector 107 to determine a distance from the control panel 207 at which the backscatter (see dashed arrows) begin to reflect. The smart sensor module 101 uses this comparison to determine the location (i.e., distance from the control panel 207) of the changed intensity of the Raman scatter in the corresponding exposed portions (104a'-104d') of the fiber optic cables (104a-104d). It is further envisioned that the smart sensor module 101 sends alerts when the changed intensity of the Raman scatter is determined along with the location to an HMI or computer. By obtaining such information, the smart sensor module 101 may form a closed loop monitoring system without visual inspection and reduce or eliminate human interaction with equipment at the site 200.

In some embodiments, the smart sensor module 101 may send an alarm and instructions for an operator or a drone to be deployed to the location of the changed intensity of the Raman Scatter to assess the situation or damage that may have occurred to the fiber optic cables (104a-104d). Based on the results of the inspection, maintenance and repair operations may be conducted. For example, landscaping or construction operations may be conducted to cover or fill the exposed portions (104a'-104d') of the fiber optic cables (104a-104d). To confirm that the exposed portions (104a'-104d') of the fiber optic cables (104a-104d) are repaired (e.g., reburied), the smart sensor module 101 may launch another pulse of light to ensure that the temperature of the Raman Scatter is constant across the fiber optic cables (104a-104d).

Figure 4:
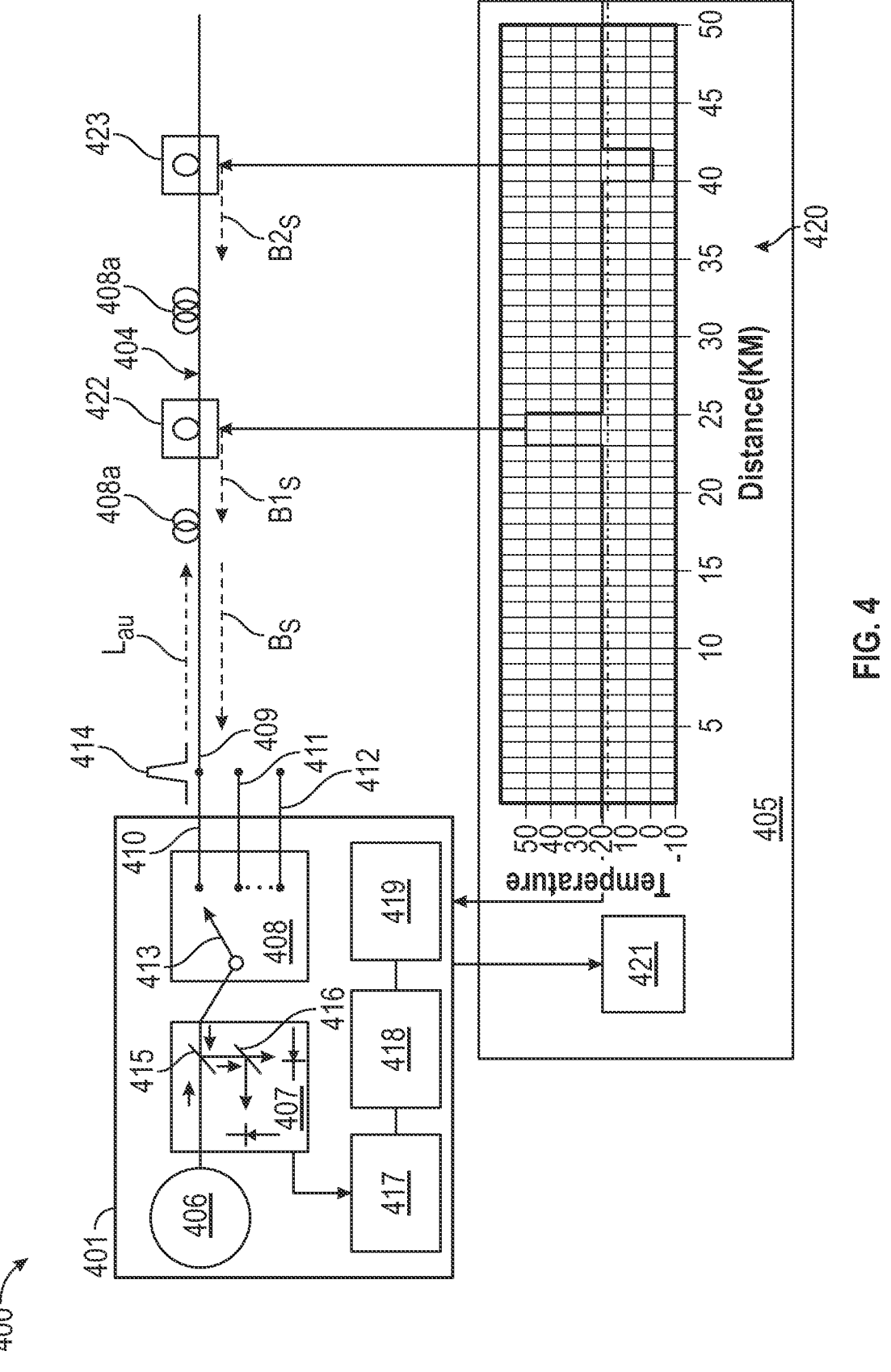
FIG. 4 illustrates a schematic diagram of a fiber optic cable monitoring system in accordance with one or more embodiments of the present disclosure.

Now referring to FIG. 4, in one or more embodiments, an example of implementing a fiber optic cable monitoring system 400 is illustrated. The fiber optic cable monitoring system 400 includes a smart sensor module 401 coupled to a fiber optic cable 404. For example, a fiber switch 408 of the smart sensor module 401 is electronically connected to the fiber optic cable 404. Additionally, the fiber switch 408 includes one or more optic fiber connectors (410-412) to couple the smart sensor module 401 to one or more fiber optic cables (404). For example, a first optic fiber connector 410 is connected to a terminal end 409 of the fiber optic cable 404 via a patch cord cable. In some embodiments, the smart sensor module 401 may be coupled between the ends of the fiber optic cable 404. For example, additional fiber switches 408a may be provided along the length of the smart sensor module 401 for connection to the smart sensor module 401. Further, a switch 413 of the fiber switch 408 is moved to the first optic fiber connector 410 thereby electronically connecting the smart sensor module 401 to the fiber optic cable 404. It is further envisioned that a second optic fiber connector 411 and a third optic fiber connector 412 may be used to connect the smart sensor module 401 to additional fiber optic cables (not shown). The switch 413 may be moved between each of the optic fiber connectors (410-412) to electronically connect the corresponding fiber optic cable for monitoring.

With the fiber switch 408 electronically connected to the fiber optic cable 404, a light source 406 launches a pulse of light 414 through the fiber optic cable 404 (see dotted arrow $L_{au}$). For example, the light source 406 may be a laser (light amplification by stimulated emission of radiation) to emit the pulse of light 414 through a process of optical amplification based on the stimulated emission of electromagnetic radiation. By using a laser as the light source 206, the pulse of light 414 will be monochromatic (i.e., one wavelength (color)), directional (i.e., a narrow beam in a specific direction), and coherent (i.e., the wavelengths are in phase in space and time). Additionally, a detector 407 may be positioned between light source 406 and the fiber switch 408 to aid in guiding the pulse of light 414 to the switch 413.

Once the pulse of light 414 is launched into the fiber optic cable 404, portions of the pulse of light 414 are scattered by fiber glass molecules of the fiber optic cable 404 as the pulse of light 414 propagates down the fiber optic cable 404. Additionally, various portions of the pulse of light 414 bounce back as backscatter (see dotted arrow $B_s$) towards the smart sensor module 401. In one or more embodiments, the backscatter enters the smart sensor module 401 via the fiber switch 408 and is received by the detector 407 of the smart sensor module 401.

In some embodiments, the detector 407 may include one or more light deflectors 415, 416. For example, a first light deflector 415 and a second light deflector 416 may be used to ensure that the pulse of light 414 from the light source 406 and the backscatter (see dotted arrow $B_s$) do not collide. The first light deflector 415 may deflect to the backscatter (see dotted arrow $B_s$) to the second light deflector 416. From the second light deflector 416, the backscatter (see dotted arrow B$_s$) is guided from the detector 407 to a data average processing unit (i.e., processor) 417 and a central processing unit (CPU) 418 for data mining.

Still referring to FIG. 4, the data average processing unit 417 and the CPU 418 process an intensity of the backscatter (see dotted arrow B$_s$) to determine a temperature of the fiber optic cable 404. The determined temperature of the fiber optic cable 404 corresponds to a temperature at a location in the fiber optic cable 404 at which the backscatter (see dotted arrow B$_s$) was generated, i.e., the location at which the pulse of light 414 bounced back in the fiber optic cable 404. The data average processing unit 417 and the CPU 418 may also determine this location by cross correlating a time stamp created when the pulse of light 414 is launched into the fiber optic cable 404 and a time at which the backscatter (see dotted arrow B$_s$) is received by the detector 407.

In some embodiments, an interface 419 of the smart sensor module 401 may provide the results on a human-machine interface (HMI) 405 in communication with the smart sensor module 401. For example, the HMI 405 may display a graph 420 which plots the temperature over the distance for the fiber optic cable 404. A solid line in the graph 420 represents the determined temperature of the fiber optic cable 404. Additionally, the smart sensor module 401 may be pre-loaded with historical temperature performance data on what temperature the fiber optic cable 404 is expected to be. For example, the historical temperature performance data may be stored on a memory or the CPU 418 within the smart sensor module 401 to also be plotted on the graph 420. A dashed-dotted line in the graph 420 represents the historical temperature performance data. Further, the smart sensor module 401 may cross-correlate the determined temperature of the fiber optic cable 404 (i.e., the solid line in the graph 420) to the historical temperature performance data (i.e., the dashed-dotted line in the graph 420). For example, if the determined temperature of the fiber optic cable 404 (i.e., the solid line in the graph 420) is above or below a predetermined threshold degree range from the historical temperature performance data (i.e., the dashed-dotted line in the graph 420), the smart sensor module 401 generates an alarm 421. Additionally, the alarm 421 also includes the location (i.e., a distance from the smart sensor module 401) at which the determined temperature of the fiber optic cable 404 (i.e., the solid line in the graph 420) is outside the predetermined threshold degree range. As the fiber optic cable 404 will have a minimal temperature variance over a length if properly buried underground, a fiber optic cable that is directly exposed under the heat of the sun will have an intense accumulated temperature compared to the fiber optic cable that is buried underground. For example, if the predetermined threshold degree range of the fiber optic cable 404 properly buried underground is 32 degrees Celsius, then an exposed fiber optic cable may have a body temperature from 38 to 40 degrees Celsius especially during peak seasons such as in summer. The alarm 421 may also be displayed on the HMI 405 to alert an operator.

As shown in FIG. 4, if the fiber optic cable 404 is not exposed and is correctly buried, the backscatter (see dotted arrow B$_s$) has a constant intensity, thereby correlating to a constant temperature in the fiber optic cable 404. This constant temperature forms a base temperature in the fiber optic cable 404. As shown in the graph 420, for example purposes only, the determined temperature of the fiber optic cable 404 is 20 degrees Celsius which matches the historical temperature performance data (i.e., the dashed-dotted line in the graph 420). This indicates that the fiber optic cable 404 is not exposed and correctly buried.

In one or more embodiments, if the fiber optic cable 404 is exposed, the smart sensor module 401 may detect various hot spots 422 (i.e., summer seasons) and cold spots 423 (i.e., winter seasons) in the fiber optic cable 404 based off predetermined threshold degree range. For example, if the backscatter (see dotted arrow Bis) has an increased intensity from the backscatter (see dotted arrow B$_s$), the hot spot 422 is detected and recorded. The hot spot 422 in the fiber optic cable 404 may have a temperature of 50 degrees Celsius which is outside the predetermined threshold degree range. The smart sensor module 401 sets off the alarm 421 indicating that the hot spot 422 has been found along with the location (e.g., 24 kilometers from the smart sensor module 401) of the hot spot 422 at which the fiber optic cable 404 is exposed. Alternatively, if the backscatter (see dotted arrow B2$_s$) has a decreased intensity from the backscatter (see dotted arrow B$_s$), the cold spot 423 is detected and recorded. The cold spot 423 in the fiber optic cable 404 may have a temperature of 0 degrees Celsius which is outside the predetermined threshold degree range. The smart sensor module 401 sets off the alarm 421 indicating that the cold spot 423 has been found along with the location (e.g., 41 kilometers from the smart sensor module 401) of the cold spot 423 at which the fiber optic cable 404 is exposed.

In some embodiments, the smart sensor module 401 may be in communication with the HMI 405 using a software application and may be provided to aid in the automation of monitoring the fiber optic cable 404. For example, the HMI 405, such as a computer, control panel, and/or other hardware components may allow an operator to interact through the HMI 405 with the smart sensor module 401 to autonomously monitor the fiber optic cable 404. The HMI 405 may be at a site approximate the fiber optic cable 404 or in a remote location (i.e., office building) not approximate the fiber optic cable 404. The HMI 405 may include a screen, such as a touch screen, used as an input (e.g., for a person to input commands) and output (e.g., for display) of a computing system. In some embodiments, the HMI 405 may also include switches, knobs, joysticks and/or other hardware components which may allow an operator to interact through the HMI 405 with the smart sensor module 401. Additionally, data (e.g., the graph 420) may be presented through the HMI 405. The HMI 405 may include a graphical user interface (GUI) that displays information on a display device of the HMI 405. The GUI may include various GUI widgets that organize what data is shown as well as how data is presented to a user (e.g., data presented as actual data values through text, or rendered by the computing device into a visual representation of the data, such as through visualizing a data model). It is further envisioned that the smart sensor module 401 may locally collect, analyze, and transmit data to a cloud in real-time to provide information, such as equipment health, performance metrics, alerts, and general monitoring, to third parties remotely or through the HMI 405.

Figure 5:
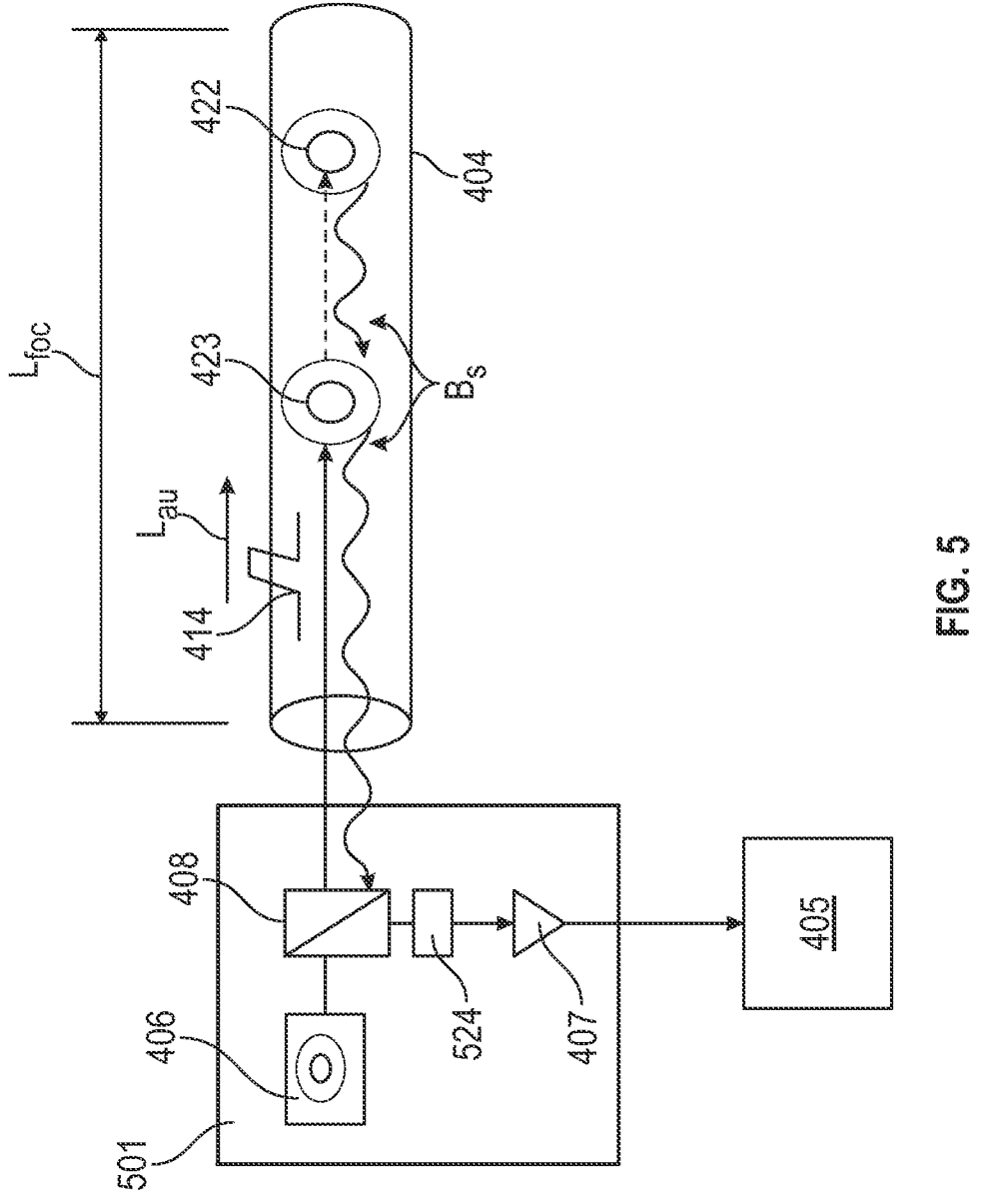
FIG. 5 illustrates a schematic diagram of a fiber optic cable monitoring system in accordance with one or more embodiments of the present disclosure.

Now referring to FIG. 5, another embodiment of a smart sensor module 501 according to embodiments herein is illustrated, where like numerals represent like parts. The embodiment of FIG. 5 is similar to that of the embodiment of FIG. 4; however, in FIG. 5, the smart sensor module 501 further includes an optical filter 524 to filter the backscatter. For example, the optical filter 524 to reduce optically amplified noise in the backscatter and improve transmission quality before the backscatter is received by the detector 407. Additionally, the optical filter 524 may enable light (e.g., beam) steering in the smart sensor module 501 as well as provide more signal, with less background noise. Further, the optical filter 524 may also be used to reflect wavelengths of the backscatter or split the backscatter into two or more beams.

In one or more embodiments, the smart sensor module 501 may automatically command the light source 406 to launch (see arrow $L_{au}$) the pulse of light 414 into the fiber optic cable 404 via the fiber switch 408. The pulse of light 414 propagates down a length $L_{foc}$ of the fiber optic cable 404. For example, the length $L_{foc}$ of the fiber optic cable 404 may be between 2 kilometers to 10 kilometers. When the smart sensor module 501 shoots the pulse of light 414 (e.g., a laser pulse from the light source 406) into the fiber optic cable 404, fiberglass molecules of the fiber optic cable 404 scatter light rays of the pulse of light 414. Additionally, the pulse of light 414 exchanges energy with lattice vibrations within the fiber optic cable 404 such that a portion of the backscatter has a sinusoidal wavelength (see arrow $B_s$).

In some embodiments, the portion of the backscatter that has the sinusoidal wavelength (see arrow $B_s$) is the Raman scattering or the Raman effect (i.e., the change in the wavelength of light that occurs when the pulse of light 414 is deflected by the fiberglass molecules of the fiber optic cable 404). Because the Raman scattering is thermally influenced by temperature, the intensity of the Raman scattering depends on the temperature of the fiber optic cable 404. It is further envisioned that the smart sensor module 501 may interpolate the intensity of the Raman scattering to determine the temperature of the fiber optic cable 404 at the position where the Raman scatter is produced.

Figure 6:
FIGS. 6 and 7 illustrate a graph from data of the fiber optic cable monitoring system of FIG. 5 in accordance with one or more embodiments of the present disclosure.
Figure 6:
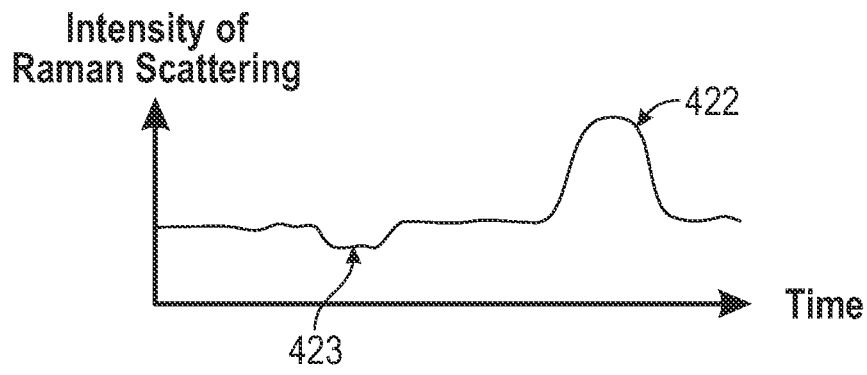
Figure 7:
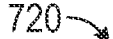
Figure 7:
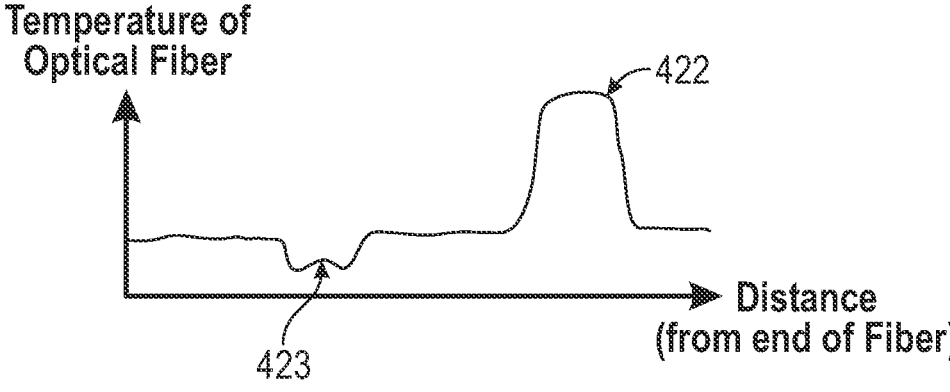

FIGS. 6 and 7 illustrate example graphs (620, 720) that may be displayed on the that the HMI 405 of FIG. 5 in communication with the smart sensor module 501. For example, graph 620 in FIG. 6 plots the intensity of the Raman scattering over time. The time may be a time from when the pulse of light is launched to when the backscatter is received. Additionally, the smart sensor module 501 may extrapolate a temperature corresponding to the intensity of the Raman scattering at each specific time to plot the temperature of the fiber optic cable over distance graph 720, as shown in FIG. 7. The distance may be a location within the fiber optic cable measured from the smart sensor module 501.

Figures 8, 9:
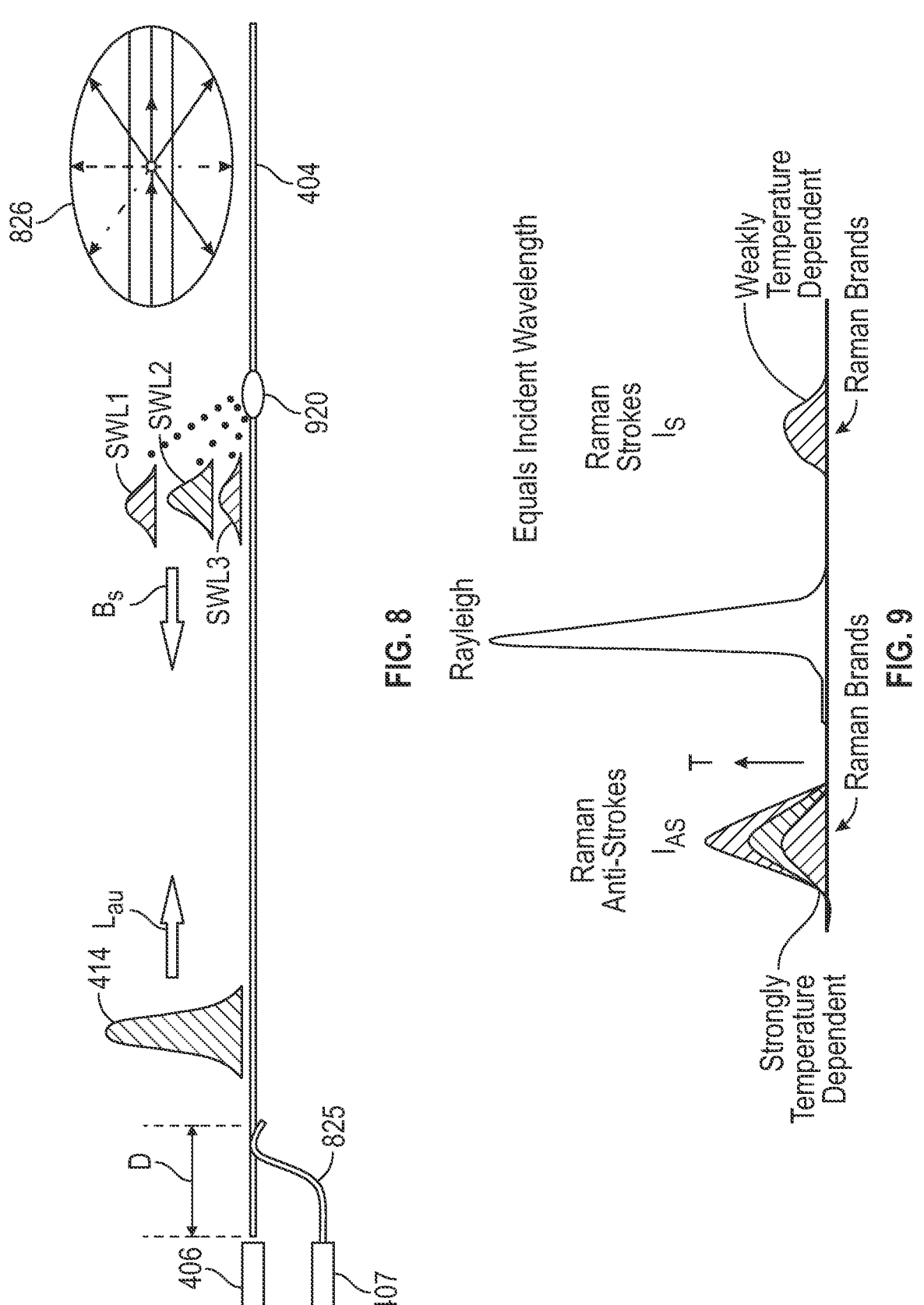
FIG. 8 illustrates a schematic diagram of a fiber optic cable monitoring system in accordance with one or more embodiments of the present disclosure.
FIG. 9 illustrates a graph from data of the fiber optic cable monitoring system of FIG. 8 in accordance with one or more embodiments of the present disclosure.

Now referring to FIG. 8, another embodiment of a smart sensor module according to embodiments herein is illustrated, where like numerals represent like parts. The embodiment of FIG. 8 is similar to that of the embodiment of FIG. 4. However, instead of the light source 406 and the detector 407 being within one smart sensor module, the light source 406 and the detector 407 may be in two separate sensors. The light source 406 may be connected at a terminal end of the fiber optic cable 404 while the detector 407 has a separate connection. For example, an electrical line 825 may connect the detector 407 to the fiber optic cable 404 a distance D away from the terminal end of the fiber optic cable 404 at which the light source 406 is provided. Additionally, circle 826 shows a close-up of the pulse of light 414 being scattered within the fiber optic cable 404 in vector form. Furthermore, the backscatter (see arrow $B_s$) may have various sinusoidal wavelengths SWL1, SWL2, SWL3.

In one or more embodiments, as shown in FIG. 9, a scattered light spectrum from a location 920 within the fiber optic cable 404 of FIG. 8 is illustrated. For example, the process of using the Raman scattering, as the pulse of light 414 scatters down the fiber optic cable 404, the backscatter produces Raman stokes (longer wavelength) and Raman anti-stokes (shorter wavelength) signal, of which both signals shifted from the launch of the light source 406. The intensity ratio of the two signals components depends on the temperature at the position where the Raman scatter is produced.

Figure 10:
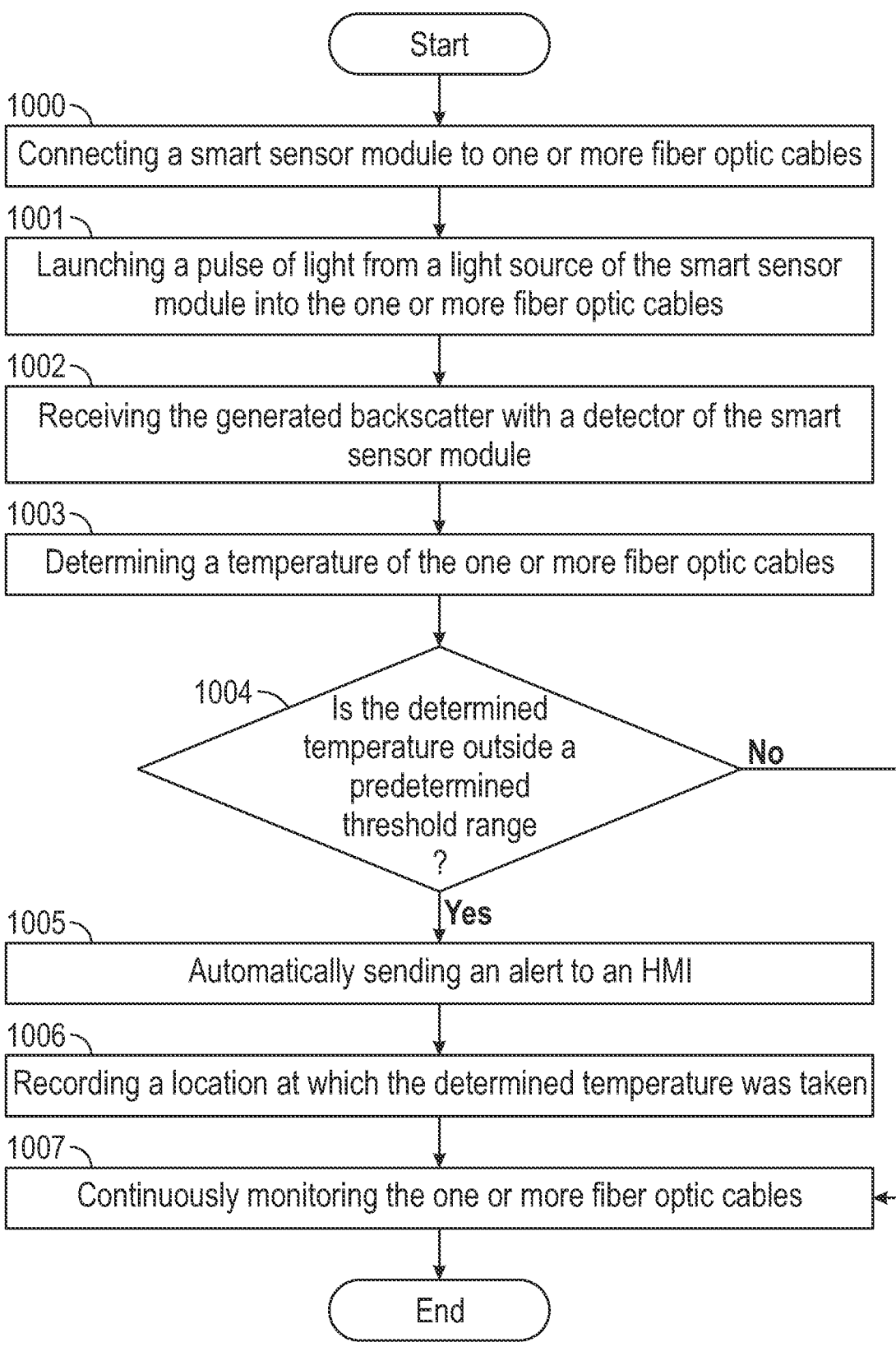
FIG. 10 illustrates a flowchart in accordance with one or more embodiments of the present disclosure.

FIG. 10 is a flowchart showing a method of using the fiber optic cable monitoring system of FIGS. 1-9. One or more blocks in FIG. 10 may be performed by one or more components (e.g., a smart sensor module coupled to a controller in communication with a fiber optic cable) as described in FIGS. 1-9. For example, a non-transitory computer readable medium may store instructions on a memory coupled to a processor such that the instructions include functionality for operating the smart sensor module. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 1000, a smart sensor module is connected to one or more fiber optic cables. For example, a fiber switch of the smart sensor module is electronically connected to the fiber optic cables. Additionally, one or more optic fiber connectors of the fiber switch are used to couple the smart sensor module to a terminal end of the one or more fiber optic cables.

In step 1001, a pulse of light is launched from a light source of the smart sensor module through the fiber optic cables. For example, the light source may be a laser such that the pulse of light is launched coherently and directionally into the one or more fiber optic cables. The pulse of light will propagate through a length of the fiber optic cables. It is further envisioned that a time stamp is created when the pulse of light is launched to log the travel time of the pulse of light.

As the pulse of light travels through the fiber optic cables, fiberglass molecules of the one or more fiber optic cables scatter (i.e., reflect) light rays of the pulse of light to generate backscatter. Additionally, the pulse of light exchanges energy with lattice vibrations within the fiber optic cables. By exchanging energy, a portion of the generated backscatter has a sinusoidal wavelength.

In step 1002, the generated backscatter is received with a detector of the smart sensor module. For example, the generated backscatter is guided back through the fiber optic cables towards the smart sensor module. The generated backscatter enters the smart sensor module via the fiber switch. From the fiber switch, the generated backscatter may be deflected into the detector. In some embodiments, an optical filter of the smart sensor module may filter background amplitude noise from the generated backscatter before the detector receives the generated backscatter.

In step 1003, the smart sensor module determines a temperature of the fiber optic cables. For example, once the detector receives the generated backscatter, an intensity (stokes (longer wavelength) and anti-stokes (shorter wavelength)) of the generated backscatter is measured, and then the intensity is interpolated to determine the temperature. Additionally, the determined temperature may be displayed on a display of an HMI.

In step 1004, after determining the temperature of the fiber optic cables, the smart sensor module determines if the determined temperature is outside a predetermined threshold range from a base temperature of the fiber optic cables. If the determined temperature is not outside predetermined threshold range, the fiber optic cables are identified as still buried and then the method moves to step 1007. In step 1007, the smart sensor module continuously monitors the fiber optic cables by repeating steps 1001-1007. However, if the determined temperature is outside predetermined threshold range, in step 1005, the controller of the smart sensor module will automatically send an alert to an HMI. This indicates that the fiber optic cables are no longer buried and exposed to environmental elements.

In step 1006, the smart sensor module records a location at which the determined temperature was taken. For example, the smart sensor module compares the time stamp of when the pulse of light was launched to when the generated backscatter is received. This time difference is used to determine a distance from the smart sensor module at which the backscattered begin to reflect within the fiber optic cables. Additionally, the determined distance corresponds to a location within the fiber optic cables that is exposed. By knowing the location at which the determined temperature was taken, a drone or the operator may be deployed to the location to inspect the fiber optic cables. Based on the results of the inspection, maintenance and repair operations may be conducted to bring the fiber optic cables back to the based temperature and then the smart sensor module continuously monitors the fiber optic cables by repeating steps 1001-1007.

In one or more embodiments, the flowchart of FIG. 10 allows for the controller, over the smart sensor module, to monitor one or more fiber optic cables continuously and autonomously. By monitoring the fiber optic cables continuously and autonomously, the smart sensor module may form a closed loop monitoring system without visual inspection and reduce or eliminate human interaction with the fiber optic cables. One skilled in the art will appreciate how utilizing the controller coupled to the smart sensor module, the autonomous monitoring system discloses herein allow for fast and early detection of exposed fiber optics cables and improve the productivity of the fiber optics cables.

Figure 11:
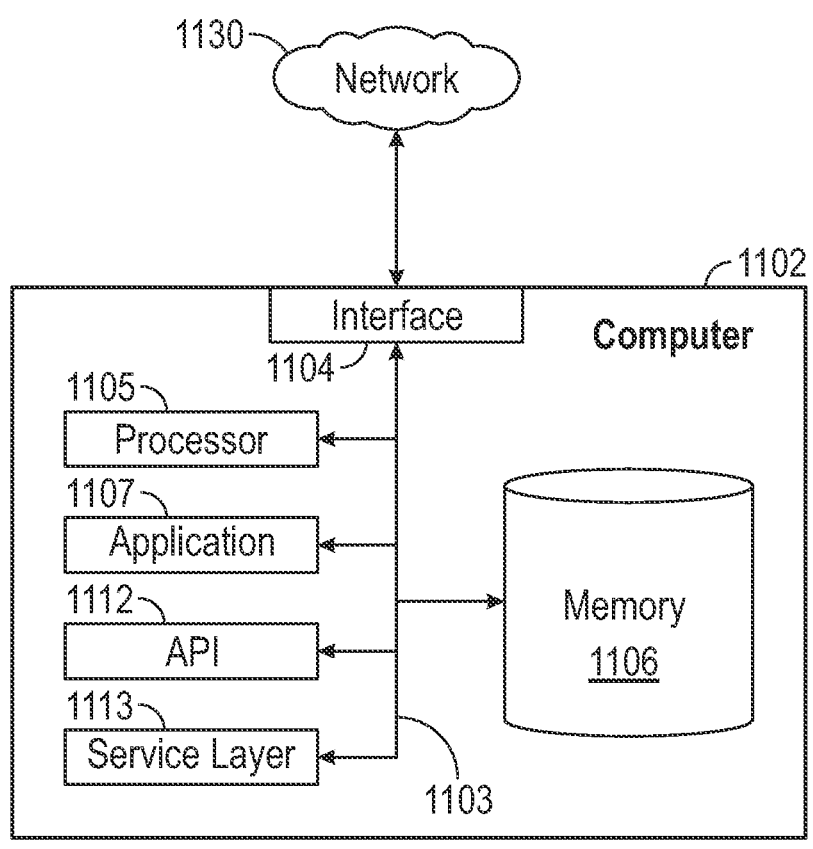
FIG. 11 illustrates a computer system in accordance with one or more embodiments of the present disclosure.

Implementations herein for operating the fiber optic cable monitoring system may include a computing system (e.g., smart sensor module) coupled to a controller in communication with the various components of the fiber optic cable. FIG. 11 is a block diagram of a computer system 1102 used to provide computational functionalities associated with described algorithms, methods, functions, processes, flows, and procedures as described in the instant disclosure, according to an implementation. The illustrated computer 1102 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1102 may include a computer that includes an input device, such as a keypad, keyboard, touch screen, or other device that can accept user information, and an output device that conveys information associated with the operation of the computer 1102, including digital data, visual, or audio information (or a combination of information), or a GUI.

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 may be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, business intelligence (BI) server, or other server (or a combination of servers).

The computer 1102 can receive requests over network 1130 from a client application (for example, executing on another computer 1102) and responding to the received requests by processing the said requests in an appropriate software application. In addition, requests may also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, both hardware or software (or a combination of hardware and software), may interface with each other or the interface 1104 (or a combination of both) over the system bus 1103 using an application programming interface (API) 1112 or a service layer 1113 (or a combination of the API 1112 and service layer 1113. The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined business functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems in a distributed environment that are connected to the network 1130. Generally, the interface 1104 includes logic encoded in software or hardware (or a combination of software and hardware) and operable to communicate with the network 1130. More specifically, the interface 1104 may include software supporting one or more communication protocols associated with communications such that the network 1130 or interface's hardware is operable to communicate physical signals within and outside of the illustrated computer 1102.

The computer 1102 includes at least one computer processor 1105. Although illustrated as a single computer processor 1105 in FIG. 11, two or more processors may be used according to particular needs, desires, or particular implementations of the computer 1102. Generally, the computer processor 1105 executes instructions and manipulates data to perform the operations of the computer 1102 and any algorithms, methods, functions, processes, flows, and procedures as described in the instant disclosure.

The computer 1102 also includes a memory 1106 that holds data for the computer 1102 or other components (or a combination of both) that can be connected to the network 1130. For example, the memory 1106 can be a database storing data consistent with this disclosure. Although illustrated as a single memory 1106 in FIG. 11, two or more memories may be used according to particular needs, desires, or particular implementations of the computer 1102 and the described functionality. While the memory 1106 is illustrated as an integral component of the computer 1102, in alternative implementations, memory 1106 can be external to the computer 1102.

The application 1107 is an algorithmic software engine providing functionality according to particular needs, desires, or particular implementations of the computer 1102, particularly with respect to functionality described in this disclosure. For example, the application 1107 can serve as one or more components, modules, applications, etc. Further, although illustrated as a single application 1107, the application 1107 may be implemented as multiple applications 1107 on the computer 1102. In addition, although illustrated as integral to the computer 1102, in alternative implementations, the application 1107 can be external to the computer 1102.

There may be any number of computers 1102 associated with, or external to, a computer system containing computer 1102, each computer 1102 communicating over the network 1130. Further, the term "client," "user," and other appropriate terminology may be used interchangeably as appropriate without departing from the scope of this disclosure. Moreover, this disclosure contemplates that many users may use one computer 1102, or that one user may use multiple computers 1102.

In some embodiments, the computer 1102 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

In addition to the benefits described above, the fiber optic cable monitoring system may improve an overall efficiency and performance in fiber optic cables while reducing cost, site safety, reduced risk of non-productive time (NPT), and many other advantages. Further, the fiber optic cable monitoring system with the smart sensor module may provide further advantages such as continuous temperature sensing for long distances in fiber optic cables, efficiently and effectively measure temperatures and distances of exposure points in real-time over various lengths of the fiber optic cables, early detection of exposed fiber optic cables, and reducing or eliminating human interaction with fiber optic cables to reduce human errors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a plurality of fiber optic cables configured to be buried under a surface;
   a smart sensor module coupled to the plurality of fiber optic cables, wherein the smart sensor module comprises:
   a light source coupled to an end of each the plurality of fiber optic cables, and
   a detector coupled to the end of each the plurality of fiber optic cables; and
   a controller coupled to the smart sensor module,
   a fiber switch to electrically connect the smart sensor module to the each of the plurality of fiber optic cables individually;
   wherein the controller manages a transmission of a pulse of light from the light source to launch the pulse of light into a first of the plurality of fiber optic cables,
   wherein the detector receives a backscatter generated from the pulse of light scattered off fiber molecules of the first of the plurality of fiber optic cables, and
   wherein the smart sensor module determines a temperature of the first of the plurality of fiber optic cables based on an intensity of the generated backscatter, and the controller sends an alert when the determined temperature is outside a predetermined threshold range from a base temperature.

2. The system of claim 1, wherein the base temperature is based on a constant intensity of the generated backscatter.

3. The system of claim 2, wherein the smart sensor module is configured to systematically interpolate the intensity of the generated backscatter over time to generate temperature of the plurality of fiber optic cables over a distance in the plurality of fiber optic cables.

4. The system of claim 2, wherein the plurality of fiber optic cables are unburied when the determined temperature is outside a predetermined threshold range.

5. The system of claim 1, wherein the light source is a laser configured to beam the pulse of light through the fiber switch.

6. The system of claim 1, wherein the smart sensor module further comprises one or more light deflectors to deflect the generated backscatter towards the detector.

7. A method, comprising:
   connecting a smart sensor module to a plurality of fiber optic cables using a switch for individually switching between each of the plurality of fiber optic cables;
   launching a pulse of light from a light source of the smart sensor module into a first of the plurality of fiber optic cables;

generating backscatter from light rays of the pulse of light scattering off fiber molecules of the first of the plurality of fiber optic cables;

receiving the generated backscatter with a detector of the smart sensor module;

determining, with the smart sensor module, a temperature of the first of the plurality of fiber optic cables based on the generated backscatter.

8. The method of claim 7, further comprising, if the determined temperature is outside a predetermined threshold range from a base temperature of the first of the plurality of fiber optic cables, automatically sending an alert to a display.

9. The method of claim 8, further comprising recording a location at which the determined temperature was taken in the first of the plurality of fiber optic cables.

10. The method of claim 9, wherein recording the location further comprises comparing a time stamp of when the pulse of light is launched to when the generated backscatter is received.

11. The method of claim 7, further comprising, if the determined temperature is not outside a predetermined threshold range from a base temperature of the first of the plurality of fiber optic cables, continuously monitoring the first of the plurality of fiber optic cables.

12. The method of claim 7, further comprising exchanging energy between the pulse of light and lattice vibrations within the plurality of fiber optic cables to form a sinusoidal wavelength in a portion of the generated backscatter.

13. The method of claim 7, wherein determining the temperature further comprises interpolating an intensity of the generated backscatter.

14. The method of claim 7, further comprising filtering background noise from the generated backscatter with an optical filter of the smart sensor module.

15. A non-transitory computer readable medium storing instructions on a memory coupled to a processor, the instructions comprising functionality for:

launching a pulse of light from a light source of a smart sensor module into a switch individually connecting each of a plurality of fiber optic cables;

receiving a backscatter with a detector of the smart sensor module, wherein the backscatter is generated from light rays of the pulse of light scattering off fiber molecules of the plurality of fiber optic cables; and determining, with the smart sensor module, a temperature of the plurality of fiber optic cables based on the generated backscatter.

16. The non-transitory computer readable medium of claim 15, wherein if the determined temperature is outside a predetermined threshold range from a base temperature of the plurality of fiber optic cables, the instructions further comprise functionality for:

automatically sending an alert to a display.

17. The non-transitory computer readable medium of claim 16, the instructions further comprise functionality for:

comparing a time stamp of when the pulse of light is launched to when the generated backscatter is received; and recording a location at which the determined temperature was taken in the plurality of fiber optic cables based on the time comparison.

18. The non-transitory computer readable medium of claim 15, wherein if the determined temperature is not outside a predetermined threshold range from a base temperature of the plurality of fiber optic cables, the instructions further comprise functionality for:

continuously monitoring the plurality of fiber optic cables.

19. The non-transitory computer readable medium of claim 15, wherein the instructions further comprise functionality for:

interpolating an intensity of the generated backscatter to determine the temperature.

\* \* \* \* \*